United States Patent
Arora et al.

(10) Patent No.: US 10,824,974 B2
(45) Date of Patent: Nov. 3, 2020

(54) AUTOMATIC SUBJECT MATTER EXPERT PROFILE GENERATOR AND SCORER

(71) Applicant: International Business Machines Corporation, Armonk, NY (US)

(72) Inventors: Pritpal S. Arora, Bangalore (IN); Bijo S. Kappen, Bangalore (IN); Gopal S. Pingali, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 794 days.

(21) Appl. No.: 15/091,882

(22) Filed: Apr. 6, 2016

(65) Prior Publication Data
US 2017/0076245 A1    Mar. 16, 2017

Related U.S. Application Data

(63) Continuation-in-part of application No. 14/851,566, filed on Sep. 11, 2015, now Pat. No. 10,521,770.

(51) Int. Cl.
  *G06Q 10/06* (2012.01)
(52) U.S. Cl.
  CPC .......... *G06Q 10/063112* (2013.01); *G06Q 10/063114* (2013.01)
(58) Field of Classification Search
  None
  See application file for complete search history.

(56) References Cited

U.S. PATENT DOCUMENTS

| | | |
|---|---|---|
| 5,386,515 A | 1/1995 | Martin et al. |
| 6,606,744 B1 * | 8/2003 | Mikurak ............... H04L 29/06 717/174 |
| 6,611,822 B1 | 8/2003 | Beams |
| 6,735,597 B1 | 5/2004 | Paradies |
| 7,007,235 B1 | 2/2006 | Hussein |
| 7,200,592 B2 | 4/2007 | Goodwin et al. |
| 7,298,867 B2 | 11/2007 | Slaski |
| 7,543,047 B2 | 6/2009 | Park et al. |
| 7,707,249 B2 | 4/2010 | Spataro et al. |
| 7,716,739 B1 | 5/2010 | McCorkendale |

(Continued)

FOREIGN PATENT DOCUMENTS

| | | |
|---|---|---|
| EP | 2498209 A1 | 2/2012 |
| WO | 2009076203 A1 | 6/2009 |

(Continued)

OTHER PUBLICATIONS

Mell et al., "The NIST Definition of Cloud Computing", NIST National Institute of Standards and Technology, US Department of Commerce, Special Publication 800-145, Sep. 2011, 7 pages.

(Continued)

*Primary Examiner* — George Giroux
(74) *Attorney, Agent, or Firm* — Edward J. Wixted, III

(57) ABSTRACT

In an approach for dynamically determining a suitable SME for a particular critical situation, a processor receives an initial problem statement. A processor constructs a collaboration channel associated with the initial problem statement. A processor identifies an SME based on a rating that associates the SME with the initial problem statement. A processor sends an invitation to the SME to join the collaboration channel.

16 Claims, 5 Drawing Sheets

(56) References Cited

U.S. PATENT DOCUMENTS

| | | | |
|---|---|---|---|
| 7,865,457 B2 * | 1/2011 | Ravin | G06N 5/022 706/46 |
| 7,917,815 B2 | 3/2011 | Rapp et al. | |
| 7,937,281 B2 | 5/2011 | Miller | |
| 8,127,236 B2 * | 2/2012 | Hamilton, II | G06N 5/022 715/757 |
| 8,200,527 B1 | 6/2012 | Thompson et al. | |
| 8,266,072 B2 | 9/2012 | Grace et al. | |
| 8,281,248 B2 | 10/2012 | Kürpick et al. | |
| 8,346,006 B1 | 1/2013 | Darbari et al. | |
| 8,352,870 B2 | 1/2013 | Bailor et al. | |
| 8,365,019 B2 | 1/2013 | Sailer et al. | |
| 8,473,432 B2 | 6/2013 | Anerousis et al. | |
| 8,572,022 B2 | 10/2013 | Hagan et al. | |
| 8,589,778 B2 | 11/2013 | Boyle et al. | |
| 8,635,283 B2 | 1/2014 | Vellanki et al. | |
| 8,639,650 B1 | 1/2014 | Gill | |
| 8,805,977 B2 | 8/2014 | Vemulapalli et al. | |
| 8,929,528 B2 | 1/2015 | Wallace et al. | |
| 9,425,966 B1 * | 8/2016 | Potlapally | H04L 9/3263 |
| 9,471,751 B1 * | 10/2016 | Kahn | G06F 16/335 |
| 2002/0194047 A1 | 12/2002 | Edinger et al. | |
| 2003/0004909 A1 | 1/2003 | Chauhan et al. | |
| 2003/0028525 A1 * | 2/2003 | Santos | G06F 17/30867 |
| 2003/0046308 A1 | 3/2003 | Weber | |
| 2004/0044542 A1 | 3/2004 | Beniaminy et al. | |
| 2004/0243422 A1 | 12/2004 | Weber et al. | |
| 2005/0086248 A1 | 4/2005 | Atchison | |
| 2005/0289168 A1 | 12/2005 | Green et al. | |
| 2006/0184378 A1 * | 8/2006 | Agarwal | G06Q 30/02 705/1.1 |
| 2006/0211404 A1 | 9/2006 | Cromp et al. | |
| 2008/0022209 A1 | 1/2008 | Lyle | |
| 2008/0072158 A1 * | 3/2008 | Samele | G06Q 10/10 715/751 |
| 2008/0114783 A1 | 5/2008 | Nguyen et al. | |
| 2008/0244418 A1 | 10/2008 | Manolescu | |
| 2008/0281915 A1 | 11/2008 | Elad | |
| 2008/0288914 A1 | 11/2008 | Schmitter | |
| 2009/0006161 A1 | 1/2009 | Chen et al. | |
| 2009/0063175 A1 * | 3/2009 | Hibbets | G06F 16/9535 705/16 |
| 2009/0063387 A1 * | 3/2009 | Beaty | G06N 5/04 706/50 |
| 2009/0083221 A1 * | 3/2009 | Pingali | G06Q 10/06 |
| 2009/0210405 A1 * | 8/2009 | Ortega | G06Q 10/10 |
| 2010/0050093 A1 | 2/2010 | Behrens et al. | |
| 2010/0057522 A1 | 3/2010 | Borowski et al. | |
| 2010/0070883 A1 * | 3/2010 | Hamilton, II | G06N 5/022 715/757 |
| 2010/0162131 A1 | 6/2010 | Gaillard et al. | |
| 2010/0250605 A1 * | 9/2010 | Pamu | G06F 16/2458 707/783 |
| 2010/0262610 A1 * | 10/2010 | Acosta | G06F 16/3334 707/748 |
| 2010/0318846 A1 | 12/2010 | Sailer et al. | |
| 2010/0325206 A1 | 12/2010 | Dayal et al. | |
| 2011/0040591 A1 * | 2/2011 | Durocher | G06Q 10/109 705/7.35 |
| 2011/0055699 A1 | 3/2011 | Li | |
| 2011/0119264 A1 * | 5/2011 | Hu | G06Q 10/00 707/728 |
| 2011/0208822 A1 | 8/2011 | Rathod | |
| 2012/0137362 A1 * | 5/2012 | Amaya Calvo | H04L 63/0218 726/22 |
| 2012/0226803 A1 | 9/2012 | Bharadwaj | |
| 2013/0132318 A1 | 5/2013 | Tanimoto et al. | |
| 2013/0151624 A1 | 6/2013 | Bhogal et al. | |
| 2013/0151948 A1 | 6/2013 | Khalil et al. | |
| 2013/0166550 A1 | 6/2013 | Buchmann et al. | |
| 2013/0197951 A1 | 8/2013 | Watson et al. | |
| 2013/0198290 A1 | 8/2013 | Thomas | |
| 2013/0218783 A1 | 8/2013 | Anand | |
| 2014/0040385 A1 * | 2/2014 | Hofman | G06Q 10/10 709/206 |
| 2014/0149436 A1 | 5/2014 | Bahrami et al. | |
| 2014/0164525 A1 | 6/2014 | Malik et al. | |
| 2014/0222865 A1 * | 8/2014 | Casey | G06F 16/951 707/771 |
| 2014/0244565 A1 * | 8/2014 | de Koning | G06F 19/3418 706/50 |
| 2014/0247460 A1 | 9/2014 | Gaertner et al. | |
| 2014/0279625 A1 | 9/2014 | Carter | |
| 2014/0337328 A1 * | 11/2014 | Sarvabhotla | G06F 16/338 707/723 |
| 2015/0032492 A1 * | 1/2015 | Ting | G06Q 10/06311 705/7.14 |
| 2015/0032751 A1 | 1/2015 | Ting et al. | |
| 2015/0046643 A1 | 2/2015 | Whelan | |
| 2015/0179186 A1 | 6/2015 | Swierk et al. | |
| 2015/0181020 A1 * | 6/2015 | Fitzsimmons | H04M 3/42221 379/67.1 |
| 2015/0310755 A1 * | 10/2015 | Haverlock | G09B 7/02 434/350 |
| 2016/0055455 A1 * | 2/2016 | Hill | G06Q 10/101 705/69 |
| 2016/0055553 A1 * | 2/2016 | Hill | G06Q 30/0601 705/26.1 |
| 2016/0072750 A1 | 3/2016 | Kass et al. | |
| 2016/0078012 A1 * | 3/2016 | Dauw | G06F 16/3344 707/706 |
| 2016/0140186 A1 * | 5/2016 | Langen | G06F 16/337 707/723 |
| 2016/0203140 A1 * | 7/2016 | Paul | G06F 16/24578 707/723 |
| 2016/0246936 A1 * | 8/2016 | Kahn | G16H 80/00 |

FOREIGN PATENT DOCUMENTS

| | | |
|---|---|---|
| WO | 2013016514 A1 | 1/2013 |
| WO | 2013026095 A1 | 2/2013 |

OTHER PUBLICATIONS

List of IBM Patents or Patent Applications Treated as Related, Dated Apr. 21, 2016, 2 pages.

U.S. Appl. No. 14/851,566, filed Sep. 11, 2015, Entitled "Dynamic Problem Statement With Conflict Resolution".

U.S. Appl. No. 14/948,670, filed Nov. 23, 2015, Entitled "Dynamic Problem Channel Constructor".

U.S. Appl. No. 14/948,766, filed Nov. 23, 2015, Entitled "Real-Time Tagger".

U.S. Appl. No. 15/092,036, filed Apr. 6, 2016, Entitled "Critical Situation Contribution and Tracker".

* cited by examiner

AUTOMATIC SUBJECT MATTER EXPERT PROFILE GENERATOR AND SCORER

BACKGROUND OF THE INVENTION

The present invention relates generally to the field of incident management, and more particularly to dynamically determining a suitable subject matter expert (SME) for a particular critical situation.

Incident management is a term describing the activities of an organization to identify, analyze, and correct hazards to prevent a future reoccurrence. An incident is an event that could lead to loss of, or disruption to, an organization's operations, services, or functions. If not managed, an incident can escalate into an emergency, a crisis, or a disaster. Incident management is, therefore, the process of limiting the potential disruption caused by such an event, followed by a return to business as usual. Without effective incident management, an incident can rapidly disrupt business operations, information security, IT systems, employees or customers, and other vital business functions.

SUMMARY

Aspects of an embodiment of the present invention disclose a method, computer program product, and computing system for dynamically determining a suitable SME for a particular critical situation. A processor receives an initial problem statement. A processor constructs a collaboration channel associated with the initial problem statement. A processor identifies an SME based on a rating that associates the SME with the initial problem statement. A processor sends an invitation to the SME to join the collaboration channel.

DETAILED DESCRIPTION

Figure 1:
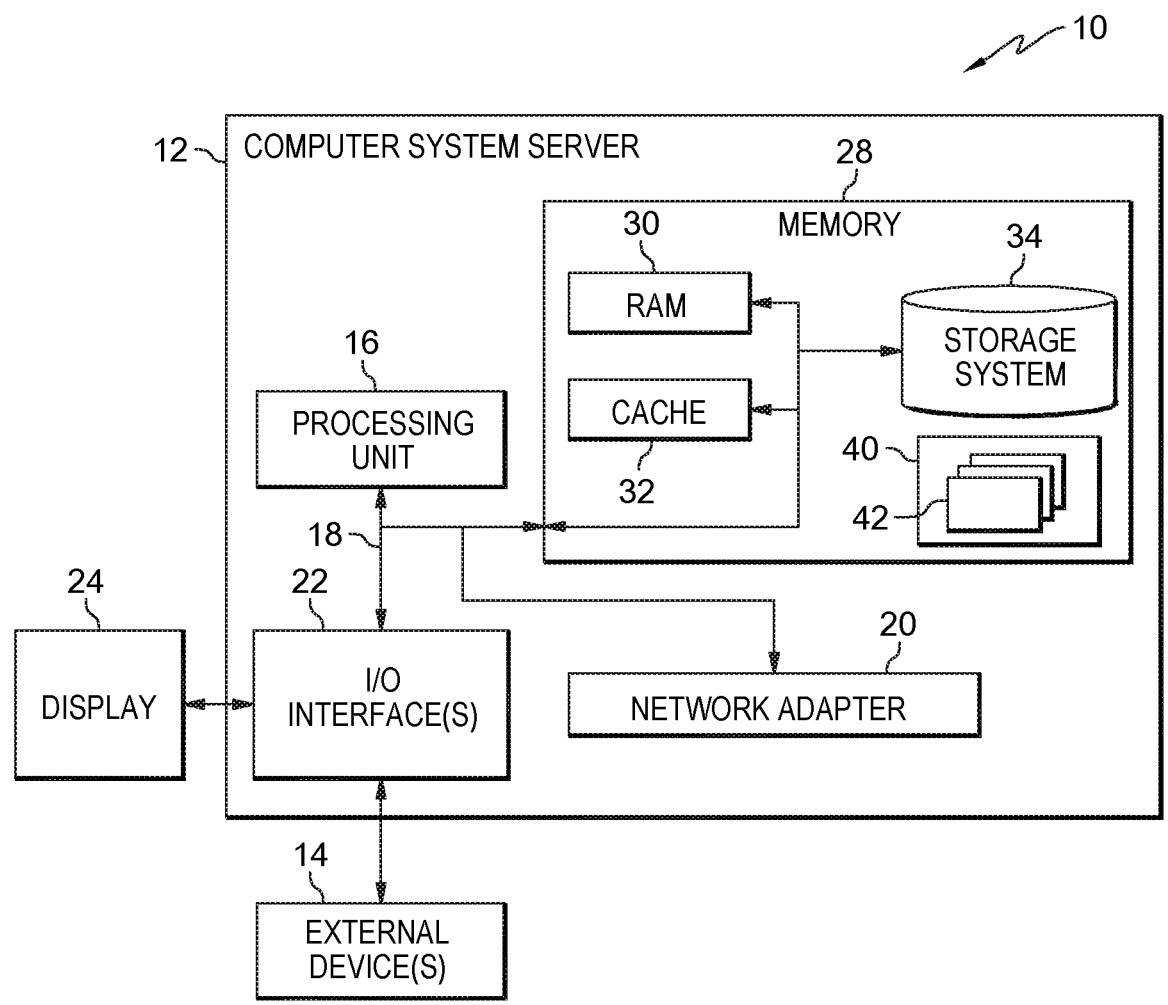
FIG. 1 depicts a block diagram according to an embodiment of the present invention.

During an information technology (IT) incident or a critical situation involving any breakdown of an IT component involving a large scale outage, one of the preliminary steps to be performed is the problem definition (i.e., to define the problem and its associated sub-problems that need to be resolved in order to restore the IT incident or normalcy of operations).

Currently, during any assignments where SME intervention is required to provide guidance or resolve issues, the SMEs are sought manually from various enterprise communities, forums, or called in by references. Embodiments of the present invention recognize the need to automatically invite SMEs, directly, for engagements from any enterprise communities, forums, or tools. Additionally, embodiments of the present invention recognize the need for a protocol or automation to identify SMEs on criteria most suited to a specific engagement based on the SMEs' actual performance on similar, previous engagements. Due to the current state of incident management, embodiments of the present invention recognize the need to dynamically determine a suitable SME for a particular critical situation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
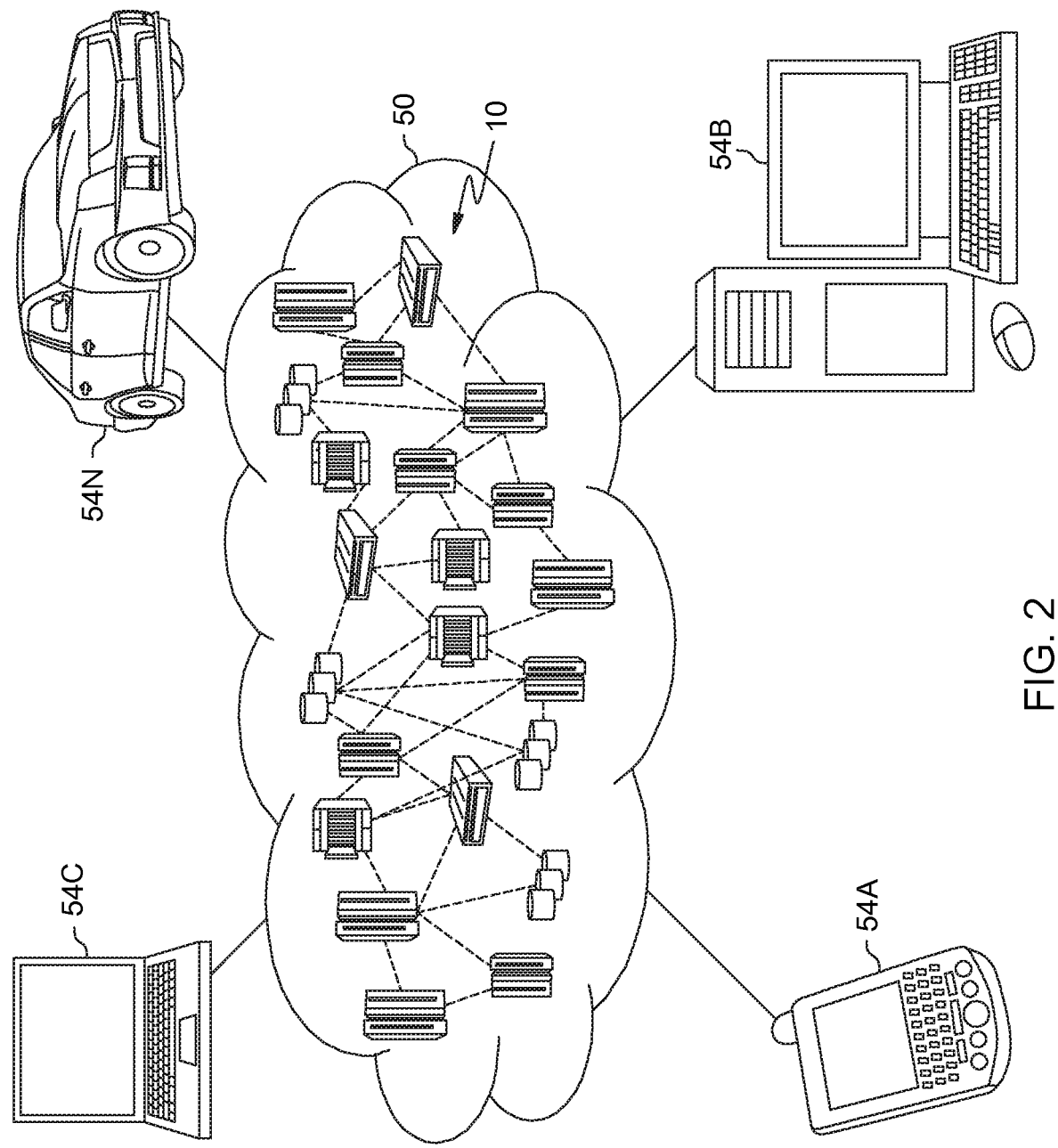
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
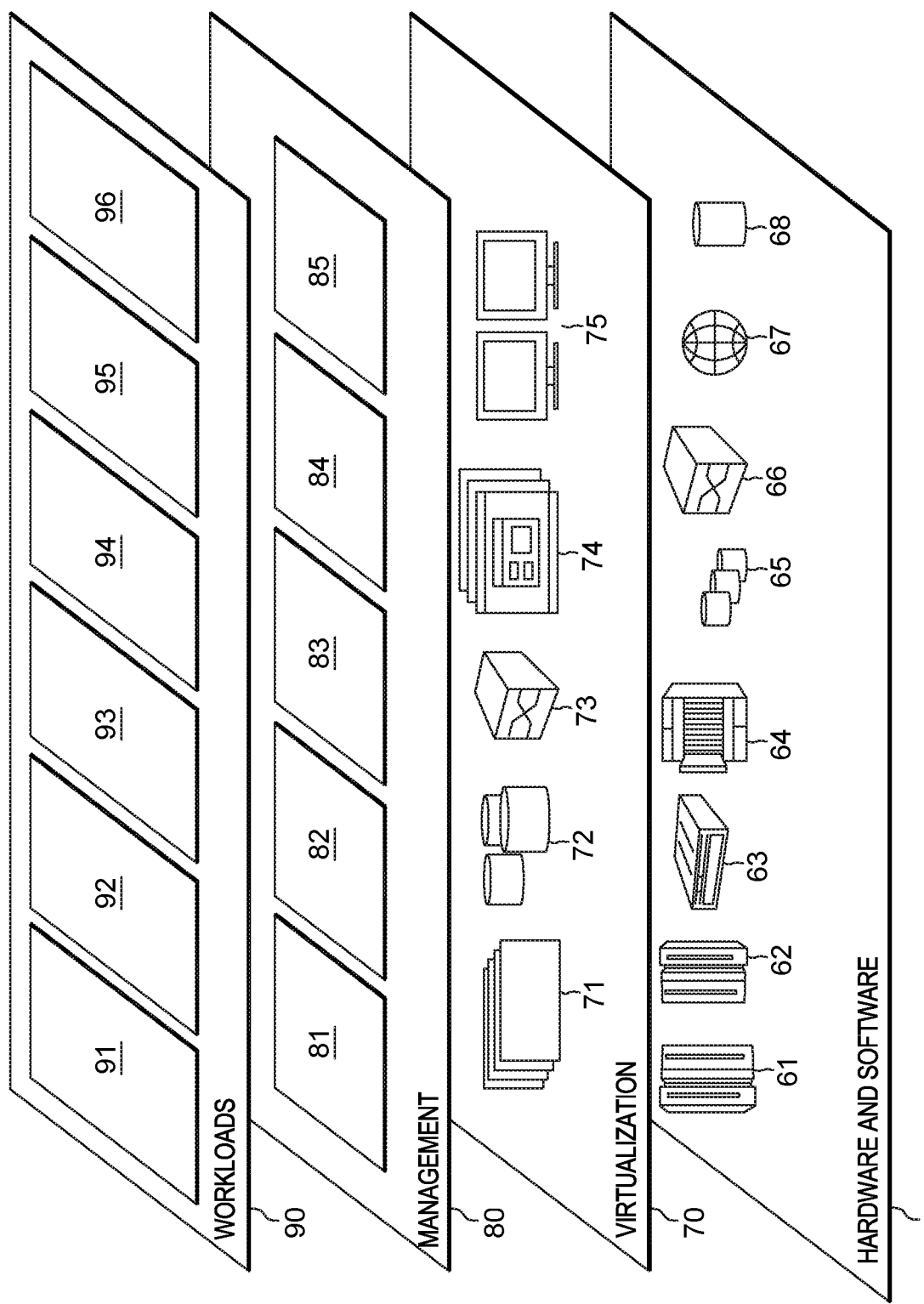
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and profile program 96.

Figure 4:
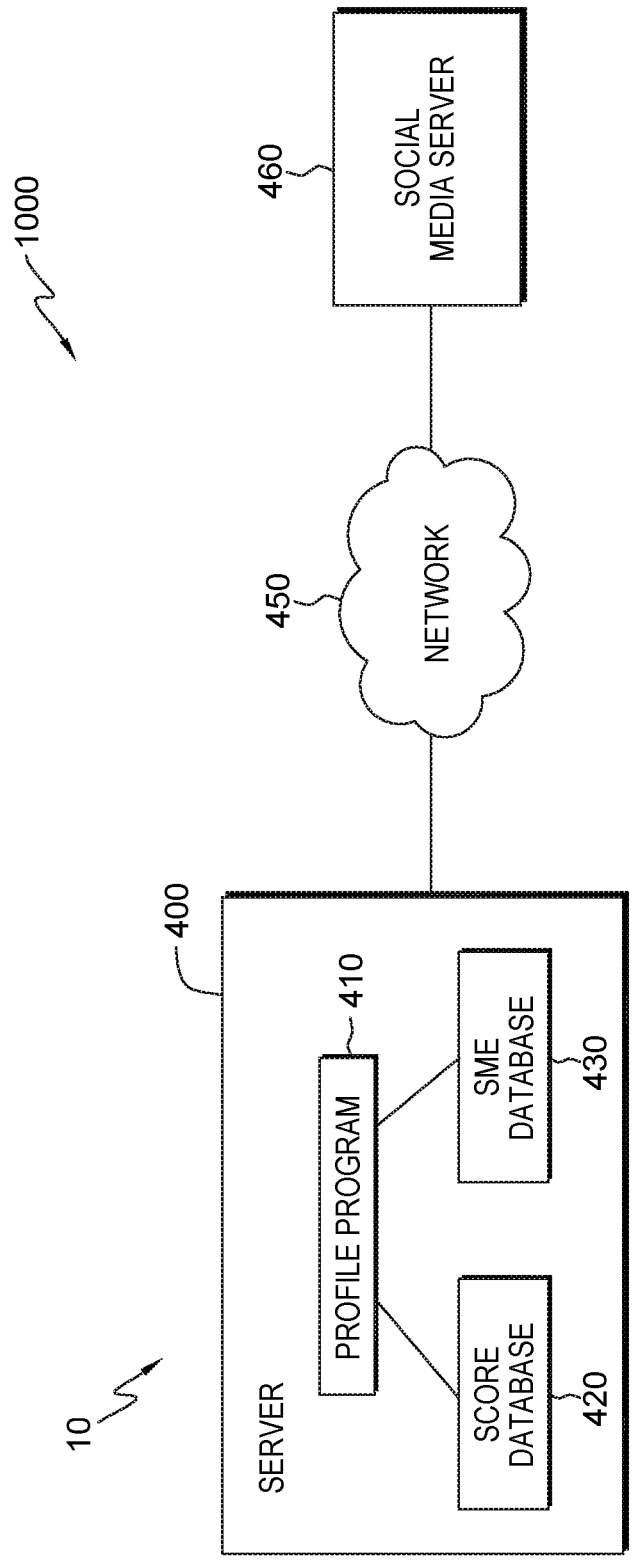
FIG. 4 depicts a block diagram of a computing system according to an embodiment of the present invention.

Referring now to FIG. 4, a diagram of an environment 1000 that includes a server 400 in cloud computing node 10, a network 450, and a social media server 460 is shown, in accordance with one embodiment of the present invention. FIG. 4 provides an illustration of one embodiment and does not imply any limitations with regard to the environments in which different embodiments can be implemented.

In the depicted embodiment, server 400 contains profile program 410, score database 420, and SME database 430. Server 400 can include components as depicted and described in further detail with respect to FIG. 1.

Working within workloads layer 90 in FIG. 3, profile program 410 operates to dynamically determine a suitable SME for a particular critical situation. In doing so, profile program 410 receives an indication of a problem statement. Profile program 410 creates problem tags. Profile program 410 constructs collaboration channels for problems. Profile program 410 retrieves SME names. Profile program 410 creates SME tags. Profile program 410 obtains ratings for the SMEs. Profile program 410 sends an invitation to the SMEs. In the depicted embodiment, profile program 410 resides on server 400. In other embodiments, profile program 410, or similar programs, can reside on another server or another computing device, provided that profile program 410 has access to score database 420 and SME database 430.

Score database 420 can be a repository that can be written to or read by profile program 410. In one embodiment, profile program 410 can allow a user to define various scores that can be associated to SMEs during critical situations and store the scores to score database 420. In some embodiments, score database 420 can store critical situation scores of SMEs from information analyzed by profile program 410. In other embodiments, score database 420 can store information needed to calculate a critical situation score for an SME. In the depicted embodiment, score database 420 resides on server 400. In other embodiments, score database 420, or similar databases, can reside on another server or another computing device, provided that score database 420 is accessible to profile program 410.

SME database 430 can be a repository that can be written to or read by profile program 410. In one embodiment, profile program 410 can allow a user to define various SMEs with the SMEs' respective skills and availabilities and store the information to SME database 430. In other embodiments, SME database 430 can store SME names with tags created by profile program 410 that describe the SME's respective skills. In the depicted embodiment, SME database 430 resides on server 400. In other embodiments, SME database 430, or similar databases, can reside on another server or another computing device, provided that SME database 430 is accessible to profile program 410.

Network 450 may be a local area network (LAN), a wide area network (WAN) such as the Internet, a cellular data network, any combination thereof, or any combination of connections and protocols that will support communications between server 400 and social media server 460, in accordance with embodiments of the invention. Network 450 may include wired, wireless, or fiber optic connections. Environment 1000 may include additional servers, computing devices, or other devices not shown.

Social media server 460 may be a management server, a web server, or any other electronic device or computing system capable of processing program instructions and receiving and sending data. In some embodiments, social media server 460 may be a laptop computer, tablet computer, netbook computer, personal computer (PC), a desktop computer, or any programmable electronic device capable of communicating with server 400 via network 450. In other embodiments, social media sever 460 may represent a server computing system utilizing multiple computers as a server system, such as in a cloud computing environment. In another embodiment, social media sever 460 represents a computing system utilizing clustered computers and components to act as a single pool of seamless resources. In some embodiments, social media server 460 contains information, such as, for example, user posts from various social media websites. In other embodiments, social media server 460 may include multiple components, as depicted and described in further detail with respect to FIG. 1.

Additionally, social media server 460 may host a social networking platform, professional networking platform, email service, or contact list capable of providing contact information or other information about a "friend," or other social networking connection. In one embodiment, social media server 460 may be a server for a social networking company that provides social network users with an ability to establish connections with other users of the same social network. Connected users may be able to view contact, interest, relationship, employment, or other information that is shared with the user by each respective connection.

Figure 5:
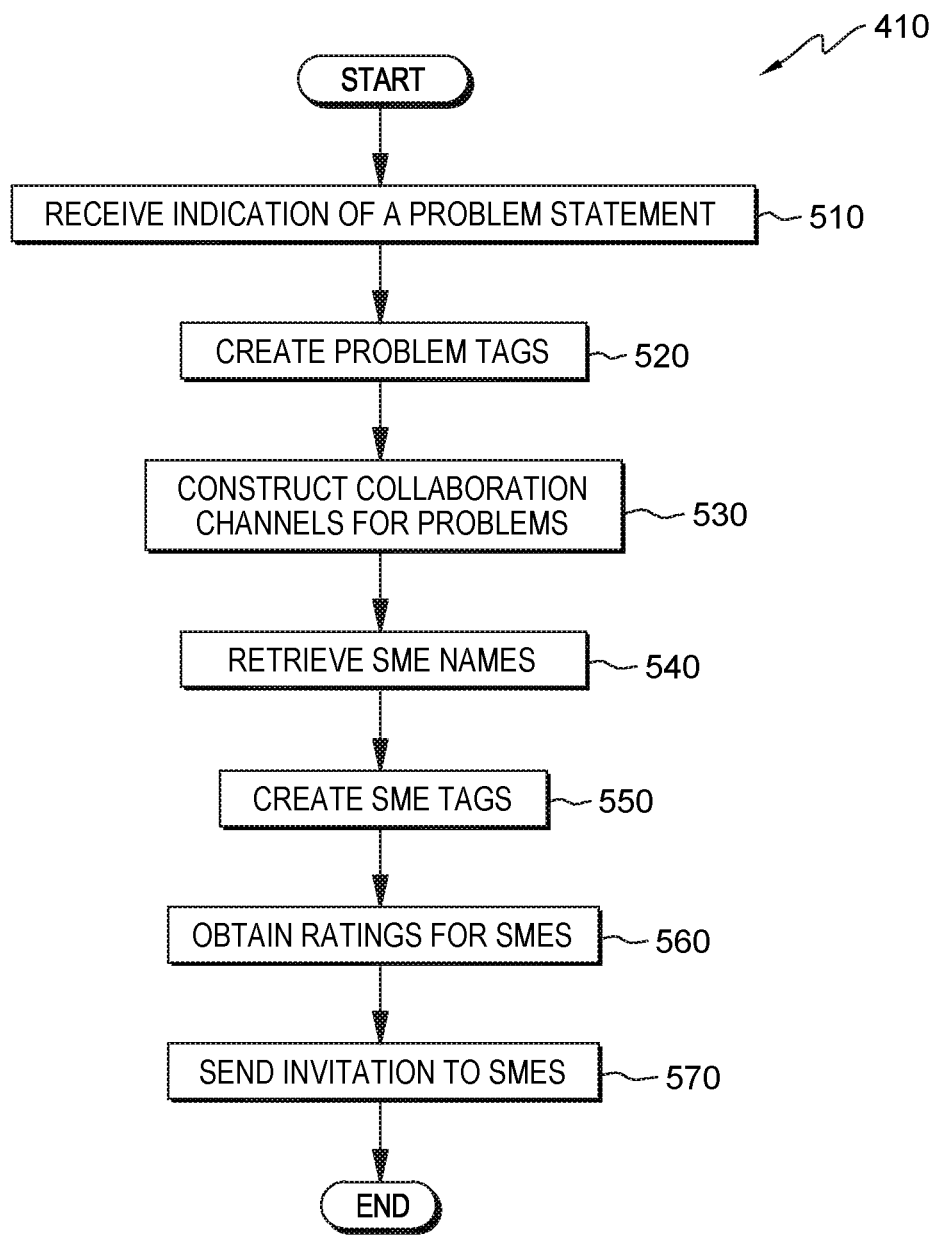
FIG. 5 depicts a flowchart of the steps of a profile program, executing within the computing system of FIG. 4, for dynamically determining a suitable SME for a particular critical situation.

Referring now to FIG. 5, a flowchart of the steps of a profile program is shown, executing within the computing system of FIG. 4, in accordance with an embodiment of the present invention. Profile program 410 operates to dynamically determine a suitable SME for a particular critical situation.

In step 510, profile program 410 receives an indication of a problem statement. In one embodiment, profile program 410 detects creation of a problem statement or a sub-problem statement by receiving an initial problem from a ticketing or incident management system. In other embodiments, profile program 410 detects creation of a problem statement or a sub-problem statement by receiving an initial problem from a manual entry by an incident manager or critical situation manager. In some embodiments, each sub-problem can be broken into new sub-problems at any stage by any authorized participant.

In one embodiment, the initial problem statement includes a statement of the problem. In other embodiments, the initial problem statement includes the service level or business impact of the problem. In some embodiments, the initial problem statement includes keywords and tags that are associated with the problem. Still, in other embodiments, the initial problem statement includes a statement of the problem, the service level or business impact of the problem, and key actions and collaboration channels being launched to resolve the problem.

In step 520, profile program 410 creates problem tags. A problem tag is a piece of information (i.e., a tag) attached to the problem that describes the problem. In one embodiment, profile program 410 creates tags associated with the initial problem. In other embodiments, profile program 410 creates tags associated with each sub-problem that is created from the initial problem. In some embodiments, profile program 410 creates tags that describe how the initial problem is associated with each sub-problem. Still, in other embodiments, profile program 410 uses a tagging mechanism (not shown) to create tags associated with the initial problem and sub-problems. In some embodiments, profile program 410 stores the problem tags to a database, such as score database 420 or SME database 430.

In step 530, profile program 410 constructs collaboration channels for problems. In one embodiment, the collaboration channels open up multiple bridges as communication channels for conversations, such as, for example: chat sessions, wiki pages, and conference calling bridges. In other embodiments, profile program 410 constructs collaboration channels based on previous collaboration channels associated with previous, similar problem statements. In some embodiments, profile program 410 constructs collaboration channels for the initial problem and sub-problems based on the created tags that describe the initial problem and sub-problems.

Furthermore, each problem or sub-problem can be further broken into new sub-problems at any stage by any authorized participant. In one embodiment, when a sub-problem is spawned, a separate collaboration channel, with appropriate participants, is automatically initiated. Each sub-problem can, in turn, spawn new sub-problems, resulting in a "problem tree" corresponding to the incident or critical situation with one or more collaboration channels associated with each "node" of the problem tree. The problem statement is dynamically updated for any of the nodes of the tree.

In step 540, profile program 410 retrieves SME names. In one embodiment, profile program 410 retrieves SME names from SME database 430, based on the tags created for the problems. In other embodiments, profile program 410 retrieves SME names from various enterprise forums/tools, external directories. In some embodiments, profile program 410 retrieves SME names from social media server 460. Still, in other embodiments, profile program 410 retrieves SME names from an SME calendar to check the availabilities of various SMEs. The SME calendar may be located within SME database 430 or located at another location (not shown).

In step 550, profile program 410 creates SME tags. In one embodiment, profile program 410 creates tags associated with an SME's skill set. In other embodiments, profile program 410 creates tags associated with an SME's availability. In some embodiments, profile program 410 creates tags that describe a correlation between a problem, an SME, and the skills required for the SME to be able to solve the problem. Still, in other embodiments, profile program 410 uses a tagging mechanism (not shown) to create tags associated with the SME and the required skills to solve the initial problem and sub-problems. In some embodiments, profile program 410 stores the SME tags to SME database 430.

In step 560, profile program 410 obtains ratings for the SMEs. In one embodiment, profile program 410 calculates a critical situation score for each SME, based on the SME's profile. The profile includes: relevant skills, organization ratings, number of years of experience, number of years of relevant experience (based on the assignment), availability criteria, speed of resolution of incidents, proximity criteria, etc. In other embodiments, profile program 410 obtains ratings for the SMEs based on a weighted score of the calculated critical situation score. The weighted score takes into account that some of the profile factors may weigh more than other profile factors at times, depending on what is needed. In some embodiments, profile program 410 updates the ratings of each SME after each engagement. Still, in other embodiments, profile program 410 stores the scores and ratings to score database 420.

In step 570, profile program 410 sends an invitation to the SMEs. In one embodiment, profile program 410 selects the SMEs with whom to send an invitation based on the ratings obtained. In other embodiments, profile program 410 automatically sends an invitation to the SMEs to join the collaboration channel. In some embodiments, profile program 410 intermittently sends an invitation to the SMEs to join the collaboration channel. When the invitation is sent intermittently, the time period is predetermined by an authorized participant. In one embodiment, the SMEs are given the option to decline the invitation before the collaboration channel opens. In other embodiments, the collaboration channel automatically opens and the SMEs are not given the option to decline the invitation before the collaboration channel opens.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for dynamically determining a suitable subject matter expert (SME) for a particular critical situation, the method comprising:
   receiving, by one or more processors, an initial problem statement, wherein the initial problem statement includes an information technology (IT) component;
   constructing, by one or more processors, an electronic collaboration channel associated with the initial problem statement, wherein a medium of the electronic collaboration channel is selected based on a previous related problem statement;
   identifying, by one or more processors, a plurality of SMEs, from a social networking platform, based on a rating that associates each respective SME with the initial problem statement, wherein the rating is calculated based on: (i) a profile of the SME that includes a plurality of factors and (ii) weights of each of the plurality of factors; and
   sending, by one or more processors, an invitation to each of the plurality of SMEs to join the electronic collaboration channel, wherein sending the invitation to each of the plurality of SMEs includes automatically bringing a respective SME onboard to the electronic collaboration channel, based on a requirement to solve the initial problem statement.

2. The method of claim 1, wherein the rating of the SME is updated after a critical situation is concluded.

3. The method of claim 1, wherein the profile includes: relevant skills, organization ratings, number of years of experience, availability, proximity, and speed of resolution of previous critical situations.

4. The method of claim 1, further comprising:
   creating, by one or more processors, a problem tag that is related to the initial problem statement.

5. The method of claim 1, further comprising:
   creating, by one or more processors, an SME tag, wherein the SME tag describes a correlation between the initial problem statement, the SME, and skills required to solve the initial problem statement.

6. The method of claim 1, wherein the electronic collaboration channel is a conference calling bridge.

7. The method of claim 1, wherein the initial problem statement is received from an incident management system.

8. A computer program product for dynamically determining a suitable SME for a particular critical situation, the computer program product comprising:
   one or more computer readable storage media and program instructions stored on the one or more computer readable storage media, wherein the one or more computer readable storage media are not transitory signals per se, the program instructions comprising:
   program instructions to receive an initial problem statement, wherein the initial problem statement includes an information technology (IT) component;
   program instructions to construct an electronic collaboration channel associated with the initial problem statement, wherein a medium of the electronic collaboration channel is selected based on a previous related problem statement;
   program instructions to identify a plurality of SMEs, from a social networking platform, based on a rating that associates each respective SME with the initial problem statement, wherein the rating is calculated based on: (i) a profile of the SME that includes a plurality of factors and (ii) weights of each of the plurality of factors; and
   program instructions to send an invitation to each of the plurality of SMEs to join the electronic collaboration channel, wherein program instructions to send the invitation to each of the plurality of SMEs includes program instructions to automatically bring a respective SME onboard to the electronic collaboration channel, based on a requirement to solve the initial problem statement.

9. The computer program product of claim 8, wherein the rating of the SME is updated after a critical situation is concluded.

10. The computer program product of claim 8, wherein the profile includes: relevant skills, organization ratings, number of years of experience, availability, proximity, and speed of resolution of previous critical situations.

11. The computer program product of claim 8, further comprising:
    program instructions, stored on the one or more computer readable storage media, to create a problem tag that is related to the initial problem statement.

12. The computer program product of claim 8, further comprising:
    program instructions, stored on the one or more computer readable storage media, to create an SME tag, wherein the SME tag describes a correlation between the initial problem statement, the SME, and skills required to solve the initial problem statement.

13. A computer system for dynamically determining a suitable SME for a particular critical situation, the computer system comprising:
    one or more computer processors, one or more computer readable storage media, and program instructions stored on the computer readable storage media for execution by at least one of the one or more processors, the program instructions comprising:

program instructions to receive an initial problem statement, wherein the initial problem statement includes a breakdown of an information technology (IT) component;

program instructions to construct an electronic collaboration channel associated with the initial problem statement, wherein:

a medium of the electronic collaboration channel is selected based on a previous related problem statement; and the medium of the electronic collaboration channel is a conference calling bridge;

program instructions to identify a plurality of SMEs, from: (i) a social networking platform and (ii) an external directory, based on a rating that associates each respective SME with the initial problem statement, wherein the rating is calculated based on: weights of each of a plurality of factors of a profile of the SME;

program instructions to create an SME tag, wherein the SME tag describes a correlation between the initial problem statement, the SME, and skills required to solve the initial problem statement; and program instructions to send an invitation to each of the plurality of SMEs to join the electronic collaboration channel, wherein program instructions to send the invitation to each of the plurality of SMEs includes program instructions to automatically bring a respective SME onboard to the electronic collaboration channel, based on a requirement to solve the initial problem statement.

14. The computer system of claim 13, wherein the rating of the SME is updated after a critical situation is concluded.

15. The computer system of claim 13, wherein the plurality of factors include: relevant skills, organization ratings, number of years of experience, availability, proximity, and speed of resolution of previous critical situations.

16. The computer system of claim 13, further comprising:

program instructions, stored on the computer readable storage media for execution by at least one of the one or more processors, to create a problem tag that is related to the initial problem statement.

* * * * *